Sept. 2, 1958 E. GRETENER 2,850,563

PROCESSES FOR THE REPRODUCTION OF IMAGES IN COLOR

Filed Aug. 21, 1952 2 Sheets-Sheet 1

INVENTOR:
Edgar Gretener

BY Pierce, Scheffler & Parker
ATTORNEYS.

PROCESSES FOR THE REPRODUCTION OF IMAGES IN COLOR

Filed Aug. 21, 1952 2 Sheets-Sheet 2

INVENTOR:
Edgar Gretener,
BY Pierce, Scheffler + Parker,
ATTORNEYS.

United States Patent Office 2,850,563

Patented Sept. 2, 1958

2,850,563

PROCESSES FOR THE REPRODUCTION OF IMAGES IN COLOR

Edgar Gretener, Zurich, Switzerland, assignor to Dr. Edgar Gretener A. G., Zurich, Switzerland, a firm Application August 21, 1952, Serial No. 305,650

Claims priority, application Switzerland November 8, 1951

5 Claims. (Cl. 178—5.2)

Figures 1, 3:
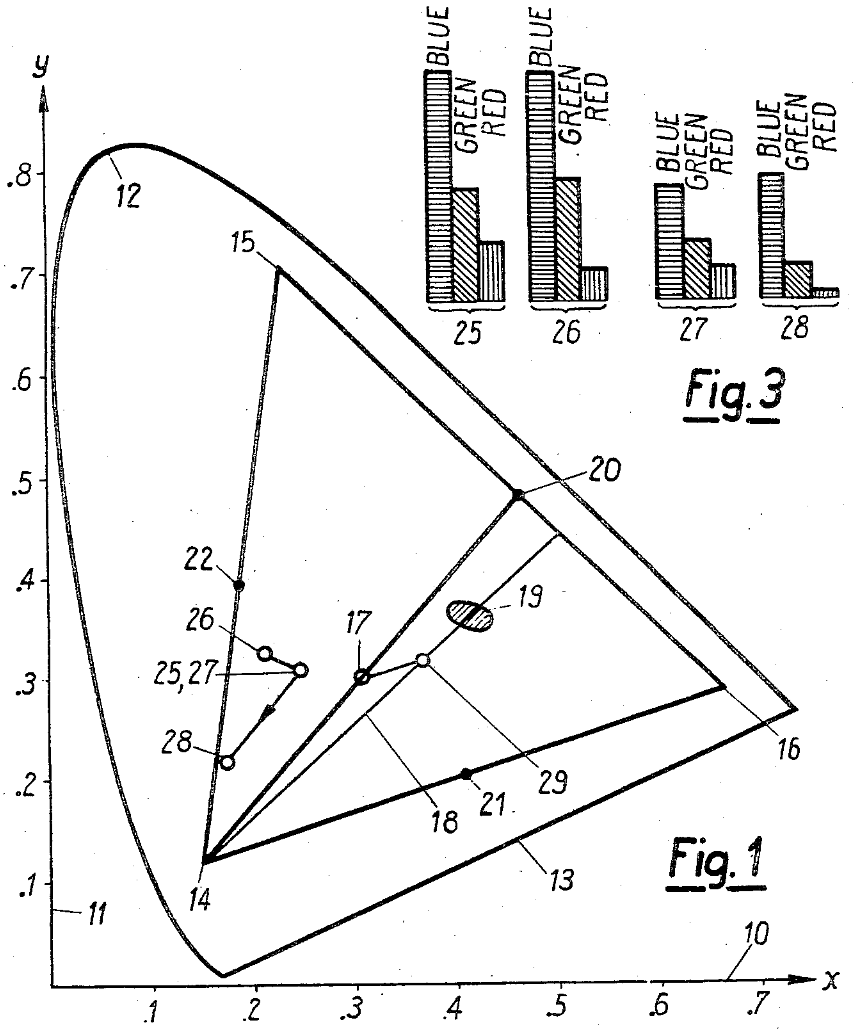

The present invention relates to processes for the reproduction of images in color, particularly to processes of color photography or of color television.

The reproduction of images in color is generally effected by employment of the so-called trichromatic principle, i. e. the color of every point of the original picture is analyzed and its color components are formed relative to three suitably chosen primary colors. In case of color television the color components are then converted into electrical color component signals which are transmitted to the receiver where they are reconverted into stimuli of differently colored light. These stimuli are then superimposed and recreate the colors of the original. In the case of color photography the trichromatic components are recorded as densities on color separation negatives. Therefrom positive separation images are formed, whereon the components are recorded in the specific manner of the employed process of reproduction, e. g., as neutral density, color densities, printing areas or other. Superimposition of the so recorded color components then serves to recreate the original picture.

In order to achieve faithful color reproduction it is necessary to keep unchanged the ratio of the effective value of the color components, as any distortion thereof will entail a false reproduction of color. Such distortion in general occurs with customary color reproduction processes, the characteristics of which are by no ways linear. This fact, as is well known, always entails a distortion in dependence upon amplitude. As a consequence non-linear reproduction processes will reproduce only certain unique color hues without distortion and invariant in dependence upon brightness. Such unique colors exhibiting the common feature that their color components are either equal in size or equal to zero, are the primary colors themselves, the three double monochromes, furthermore that particular color which is reproduced by three components of equal size. All other colors, the components of which do not belong to the above mentioned class, i. e. the color components which are not equal or zero, will be distorted when reproduced by a non-linear process.

In the hitherto known three-color processes white, which is generally considered as non-color, is reproduced by superimposition of three components of equal size. Thereby the scale of greys is kept strictly neutral and color tingeing of the whites varying in dependence upon brightness is avoided.

The real colors, strictly speaking, are subject to the above mentioned distortion in dependence on brightness. This dependence of colors on brightness is particularly disadvantageous with the so-called face and skin colors (flesh tones), distortion of which produces an unnatural and consequently extremely disagreeable impression.

It is an object of the present invention to remedy as far as possible the above mentioned disadvantages and to provide color reproduction processes without disagreeable color distortion.

It is furthermore an object of the present invention to provide a color reproduction process which will reproduce a certain selected color, preferably a face color free of brightness distortion.

Another object of the invention is to provide processes for color television or for photographic color reproduction, wherein a selected color is reproduced free of amplitude distortion.

According to the present invention, a process of color reproduction by means of a plurality of variable color components related to suitably chosen primary colors is employed, wherein the primary colors are determined in such a manner that a selected color is reproduced with at least two color components having a ratio equal to unity, and wherein white is reproduced with the ratios of color components substantially deviating from unity.

In a preferred case of the invention a face color is chosen as that selected color.

Further objects and features of the present invention will become evident and the principle thereof will be explained in detail in the following description with the aid of examples and with reference to the attached drawing, wherein:

Fig. 1 serves to explain the principle of the present invention with the aid of the ICI color triangle.

Figure 2:
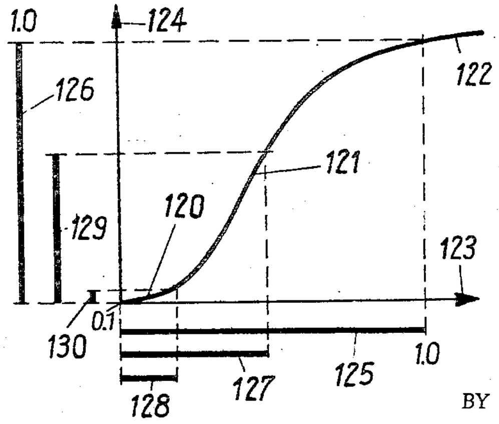

Fig. 2 represents the non-linear characteristics of a reproduction process.

Fig. 3 serves to explain the influence of a non-linear characteristic on color reproduction.

Figures 4, 5:
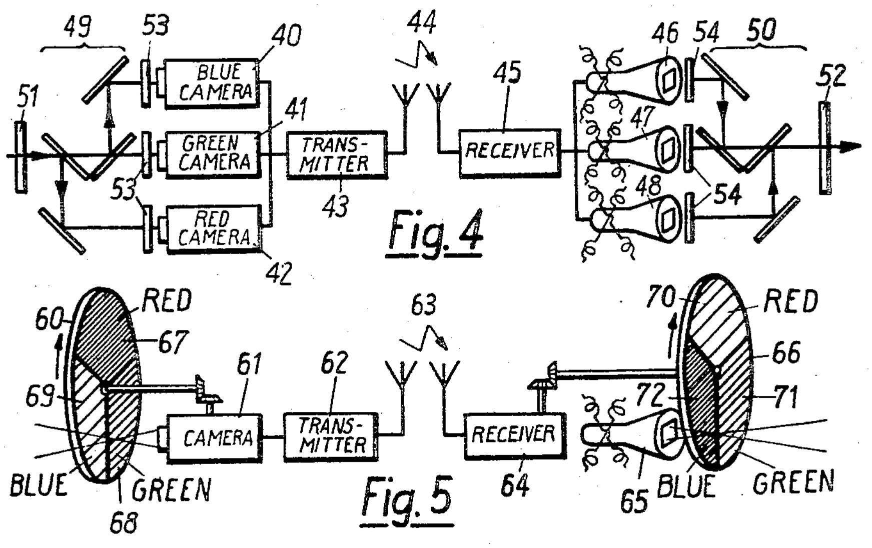
Figure 6:
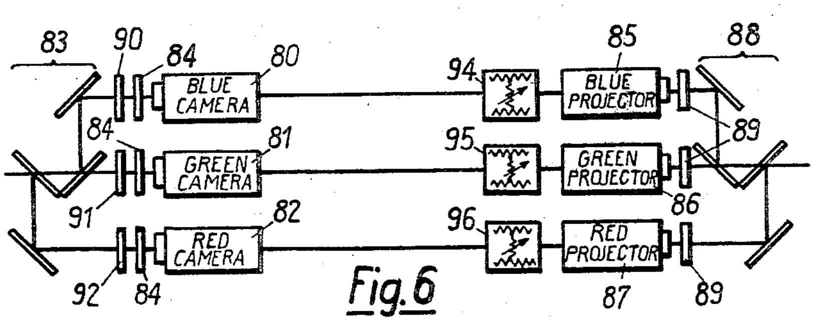
Figure 7:
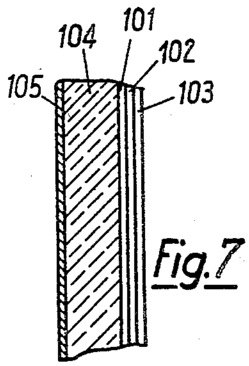
Figure 8:
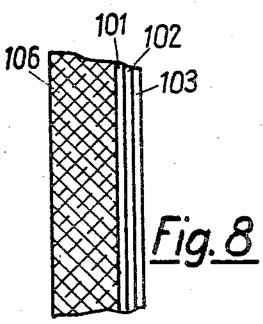
Figure 9:
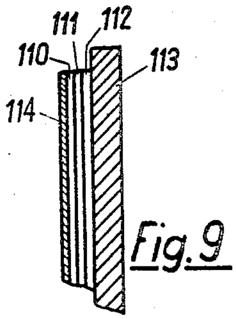

Figs. 4, 5, and 6 show embodiments of television systems employing the principle of the present invention, and, Figs. 7, 8 and 9 serve to explain the application of color photography.

As is well known, any color, e. g. of a light beam or of an object may be defined by its hue and its saturation. As definition of a color by these values is somewhat subjective and empirical, color coordinate systems have been devised, of which the ICI color triangle shown by Fig. 1 has come into general use. In this triangle a color is determined by its $x$ and $y$ (and $z$) components. In the habitual form of the ICI color triangle the $x$-component is plotted in direction of the horizontal (abscissa) axis 10 and the $y$-component in direction of the vertical (ordinate) axis 11. The pure spectral colors are located along a curved line 12, the purple colors along a straight line 13. The three colors of a customarily employed set for reproduction form the corners 14, 15 and 16 of a triangle. This triangle delimits the area within which any desired color may be reproduced by additive mixture of the primary reproduction colors, blue, green and red in a suitable ratio of intensities. Point 17 corresponding to neutral white ("illuminant C") is located inside this triangle. Attention must be invited to the fact that the ICI coordinate system only indicates relative values. The absolute values of the components of a color and consequently its brightness is not represented.

If a color is to be reproduced by (additive) mixture of three colored lights, the required ratio of intensities may be derived in a well-known manner from the location of this particular color within the triangle formed by the primaries. In the customary color process the primary colors green, red and blue are generally chosen in such a manner that superimposition of these three lights with a ratio of intensities equal to unity (red: green:blue=1:1:1) reproduces white.

In contradistinction thereto in a process according to the present invention the primary reproduction colors are chosen in such a manner that superimposition of the three reproduction colors with equal intensity produces a selected color different from white. White is consequently reproduced with a ratio of color components substantially deviating from 1:1:1.

As was mentioned above the "color components" employed in the different stages of a reproduction process may be of different physical nature. In the case of television they are transformed for transmission into color component signals. The effective value of the color component which is essential for faithful reproduction is represented by the size of the corresponding signal. In case of photographic or printing processes the effective value of the component may be represented by the varying density value of a neutral or color transparency, the varying size of the printing area etc. It is obvious that the "size" of these effective values may not in all cases be compared by simple measurement. In general therefore the effective values of color components must be measured by different scales which are arbitrarily chosen for the three component colors in such a manner that color components measured in their respective scale as of equal size, or in other words with their ratio equal to unity lead to the same point of the reproduction characteristic of the process. Consequently a color having components of "equal size" will be reproduced without brightness or amplitude distortion as will be explained in detail below. It is obvious that the characteristics of the reproduction process valid for the three components must be approximately identical.

If now a selected color is reproduced by three components with a ratio equal to unity as is provided by the present invention, this selected color is unique in that respect that it is always reproduced correctly and independently of its brightness even by a process with non-linear characteristics. This will be explained to better understanding with the aid of Figs. 2 and 3.

Fig. 2 represents a non-linear characteristic as is frequently encountered. This characteristic represents the relation existing between the original value and the reproduced value in the entire process or in partial steps thereof, as the case may be. By way of example it may represent the inter-relation between the component color brightness of a point of the original and the brightness of the corresponding spot on the luminous screen of the receiver tube viewed through the corresponding color filter. As has been mentioned above, the characteristic of the color reproduction process must be substantially identical with respect to the different color components, or the characteristics related to the individual components must be similar to such an extent that they can be made to coincide at least approximately by simple linear transformation. In the latter case the scales of these characteristics are determined in such a manner that the reproduction of components of "equal effective value" or with a "ratio equal to unity" leads to corresponding points on these characteristics.

As is shown such a characteristic comprises a "toe" 120, a center part 121, and a "shoulder" 122. The scale along the two axes 123 and 124 is so chosen, that a component 125 equal to unity is reproduced as a component 126 likewise equal to unity. If the value or size of the component is brought to e. g. 127 or 128 the absolute value of the reproduced components 129 and 130 will be distorted by this characteristic. The ratio of two or more components so varied will however not be affected thereby as long as they are of equal size, i. e., as long as they are reproduced by the same point of the characteristic. This is no longer the case if the components are unequal. By way of example a color reproduced by means of such a characteristic having color components 25 with a ratio of 1:.5:.25 as is represented in Fig. 3 on an arbitrary scale. The reproduction will provide components 26 with a ratio distorted to be 1:.53:.113, due to the missing linearity. The amount of color distortion is, however, not constant, but depends upon the absolute value of the color components, i. e., upon brightness. This will easily be understood. If by way of example the color is to be reproduced with half intensity i. e. with components 27 of only half of the absolute value, but with a ratio equal to that of signals 25, i. e. .5:.25:.125 thereof, the three color components will assume a ratio of .5:.127:.017 after reproduction. This non-linear behavior is often also characterized by the "gamma" of the process. This term is frequently used in photography and has also come into use in television. Generally it designates the slope of the used part of the characteristic plotting input and output signal magnitudes in a log vs. log fashion. If in Fig. 2 the input signal is plotted along axis 123 and the output signal along axis 124 both in a logarithmic scale, the "gamma" will be equal to the slope of part 121. Due to the logarithmic plotting a gamma equal to unity indicates a linear, a gamma equal to 2 a quadratic relationship. Gammas as high as 2.5–2.75 are often met in television. This is, e. g. due to the response of the employed reproduction cathode-ray tubes, with which the screen brightness varies with about the 2.75 power of the control grid voltage.

The location of the color reproduced by the sets of components 25, 26, 27 and 28 is indicated in Fig. 1. The colors reproduced by components 25 and 27 coincide whereas the produced colors 26 and 28 deviate to a considerable degree from the original color. This dependence of reproduction on amplitude in a process with non-linear characteristic occurs with all colors with the following exceptions: (1) the primary colors blue, green and red, which are reproduced each by one component only the other two components being equal to zero, (2) the double-monochromes 20, 21 and 22 which are reproduced with two components with equal size the third component being equal to zero and (3) the color reproduced by three components of "equal size," or with a ratio "equal to unity."

In this case the missing linearity of the reproduction characteristics only causes a distortion of brightness which will, however, affect the quality of reproduction to a considerably lower degree. Preferably this unique color will therefore be located at such a point of the color triangle where a faulty reproduction would be particularly disagreeable.

This is particularly the case with the skin and face colors, a faulty reproduction of which is particularly disagreeable to the human eye. Investigations have proved the astonishing fact that the face colors are all located within a comparatively small area 19 of the color triangle and that the seemingly great difference, e. g. between a pale and a sun-tanned complexion depends less on a variation of color but of brightness. This area which embraces the customarily encountered variation of face and skin colors is in no direction larger than approximately the double value of the just-perceptible difference in chromaticity. It is delimited in the direction of the $x$-axis towards left and right approximately by the coordinates $x=.39$ and $x=.44$, and in the direction of the $y$-axis upwards and downwards approximately by the coordinates $y=.37$ and $y=.345$. Under certain circumstances naturally particular face colors may occur, which are located outside this area. They will, however, still be located in the vicinity thereof so that reproduction may be effected by employment of the method according to the present invention without disturbing color distortion. For all face colors reproduced by a trichromatic system adapted to a ratio of 1:1:1 for white, the red component of a face color will always be larger than its green one and this in turn will be larger than its blue one. Strictly speaking this of course applies only to such sets of reproduction colors, basically blue, green and red, as are customarily employed today and are represented by way of example by Fig. 1.

These facts provide an explanation of the particular sensitivity of the skin colors to reproduction by non-linear systems. The great range of brightness which is covered by the skin colors will give rise to a considerable distortion of colors during reproduction by a non-linear characteristic, which will be so much more striking as in reality the face colors are located within this very small limited color area. This effect is further enhanced if, e. g. faces of the pale and the tanned complexion type appear simultaneously.

Preferably therefore the three primary colors are chosen in such a manner that a selected skin color located inside the area of skin colors is reproduced by components of equal size. This particular skin color will always be reproduced correctly and independent of its brightness notwithstanding a missing linearity of the characteristic of the process. In view of the restricted size of the skin color area which as mentioned above only slightly exceeds the limits of the just-perceptible difference in chromaticity, this means that practicly all skin colors may be correctly reproduced by such a process. The disadvantage of a certain dependence of the grey scale on brightness may be considered as of minor importance as the slight color contamination of the grey tones may be kept within reasonable limits by suitable measures when taking the pictures (adaptation of illumination, adaptation of background colors, etc.). The skin color represents a considerably sharper criterion to the human eye for the quality of color rendition than the conservation of an always neutral scale of the greys. A process based on the face colors seems to be more correct also from an objective point of view than a process based on white which is much more subject to incidental influences, such as varying color of illumination.

If now a face color is selected to be reproduced by three components of equal size this implies that the process will reproduce white by components of deviating ratio. Due to the above mentioned well determined location of the face colors, the blue component of white will then be larger than the green one and this in its turn will be larger than the red one.

Experience has shown that this condition of "ratios equal to unity" need not necessarily be complied with strictly. The advantages of a process according to the present invention may be attained to a satisfactory measure if the selected face color is reproduced with only a red-to-green ratio equal to unity, whereas its blue components assume a deviating ratio. In this case white is reproduced with a green component substantially larger than the red component and the color reproduced with a ratio of 1:1:1 will be located on the straight line 18 passing through point 14 (blue) and the area of face colors. Even in this preferred case brightness distortion of the face colors will be negligible as the eye is less sensitive to variations of the blue component than to variations of the green and red component or to variations of the red-to-green ratio. On the other hand this preferred case permits to reduce color distortion of the neutral greys. Preferably the color represented by a ratio of components equal to unity is located at the straight line 18 at an equal distance from the locus of white and of the area of face colors as indicated by point 29.

The principle of the present invention does, however, not require that a face color be chosen as "selected color." Any other color may be selected if faithful reproduction thereof independent of amplitude appears desirable with preference over all other colors. In such a case this selected color is reproduced with the ratio of all components, or in the above mentioned preferred case, only with green-to-red ratio equal to unity.

If a process according to the present invention is employed for color television a pick-up apparatus must be adapted to produce the selected color by component color signals having the desired ratio, i. e. all components equal to unity, or the red-to-green equal to unity.

It is obvious that for this purpose a particular set of primaries may be selected. In view of this set of primaries the spectral response of the pick-up apparatus must then be so adapted, that three signals of equal size are formed when the selected face color is picked-up. The receiver must also be based on that particular set of primaries, so that it will reproduce the selected color if fed with three color component signals of equal size.

Alternatively, however, the pick-up and reproduction apparatus of systems employing the customary set of primaries may be so adapted by suitable measures that transmission of the television signals is effected according to the present invention, viz. that a selected color is transmitted by signals of equal size and white with a signal ratio deviating from unity. This will be explained by the block diagram of Figs. 4 and 5, schematically showing such adapted television systems. As the auxiliary devices required for the transmission of color television are known to anyone skilled in the art, they have been omitted in the drawing and only such parts have been shown as are required for proper understanding of these embodiments.

The system schematically shown by Fig. 4 employs the so-called "simultaneous" principle of transmission. The pick-up apparatus comprises three cameras 40, 41, and 42 related, e. g. to a blue, green and red primary. The component color signals produced by the three cameras are fed to a transmitter 43 and transmitted over a radio link 44 to a receiver 45. At the receiver the component color signals are separated and fed to three receiver tubes 46, 47, and 48. At the transmitter a color splitter 49 serves to split up the image to be televised into its color components and a similar color splitter 50 serves in the well-known manner to superimpose the received images. Three color filters 53 related to the customarily employed primary colors located each in front of one of the cameras and three corresponding color filters 54 are located in front of the receiver tubes. The color filters 53 are so adjusted that signals of equal size are produced by the three cameras if white is picked up. The color filters 54 are so adapted that white is produced if the three receiver tubes are fed with signals of equal intensity.

In order to employ the principle of the present invention with such a transmission system a filter 51 is inserted in the pick-up light path in front of color splitter 49 and a second color filter 52 into the projection light path behind color splitter 50. The color filter 52 at the receiver is held in the selected color, i. e. white light passing through the filter is transformed into light of the selected face color. The transmission characteristics of filter 51 at the transmitter must be so chosen that light of the selected color passing through it is transformed into white light. In other words, the transmission characteristic of filter 51 must be "complementary" to the transmission characteristic of filter 52.

Fig. 5 shows another system adapted in a different way to perform the principle of the present invention. This system employs the well-known "sequential" principle of transmission. A rotating color filter or filter wheel 60 is located in front of the camera 61 and causes the image to be televised to be scanned sequentially in the component colors. The signals are fed to a transmitter 62 and transmitted over a radio link 63 to a receiver 64 which controls a receiver tube 65. A second rotating color filter wheel 66 is arranged in front of the receiver tube rotating synchronously with color filter wheel 60, whereby the images produced on the screen of tube 65 are seen in a correct color.

The color filters disposed on the sectors of the two filter wheels 60 and 66 and designated by ways of example Blue, Green and Red, are chosen that white is transmitted with corresponding sequential signals equal in size.

In order to employ the principle of the present invention the sectors of rotating color filters are fitted with additional neutral density filters of different transparency as indicated by hatching.

The neutral density filters on the rotating filter 60 must be adapted to adjust the intensity of the light related to succeeding images of red, green and blue color to the ratio of the selected color. If a face color is selected, the light passing the green sector must be attenuated to a lower degree than the red light passing the red sector, but to a higher degree than the light passing the blue sector. That means that the neutral density filter 67 in front of the red sector must provide a higher density than the filter 68 in front of the green sector, and that the density of filter 69 in front of the blue sector must be lowest of all. This is indicated by the different density of hatching. At the receiver the reverse effect must be achieved. That means that the density of the additional neutral density filter 70 in front of the red sector must be lower than that of filter 71 in front of the green sector and the density of filter 72 in front of the blue sector must be the highest of all. The densities of the neutral filters of transmitter and receiver are thus what may be referred to as "complementary."

Fig. 6 schematically shows another colour transmission system which may be employed if the reproduction apparatus at the receiver provides a substantially linear characteristic. In this case the incoming picture signals which are adapted to assume a ratio of 1:1:1 for the selected color may be transformed electrically into signals adapted to assume a ratio of 1:1:1 for white. These transformed signals are then fed to the reproduction apparatus which is adapted to reproduce white for signals of equal size. The set-up of the system of Fig. 6 is similar to the set-up of Fig. 4. Three cameras 80, 81 and 82 are employed for generating the color component signals, and a color splitter 83 and color filters 84 are employed in the same way as was explained with respect to Fig. 4. At the receiver three projection-type receivers 85, 86, and 87 serve to produce the component color images which are superimposed by color splitter 88 after having passed the respective color filters 89.

In order to adapt the pick-up apparatus to the principle of the present invention three neutral density filters 90, 91, and 92 are inserted each in the light path of one of the cameras and if a face color is selected for undistorted transmission the density of the filters must be adjusted in the same manner as the filter employed of filter wheel 60 of Fig. 5. The signals transmitted to the receiver will consequently assume a ratio of 1:1:1 for that selected face color. Variable electrical attenuators 94, 95, and 96 are inserted each into one of the transmission channels and must be set in such a manner that the appertaining sets of incoming signals are transformed into corresponding sets of signals which assume a ratio of 1:1:1 for white. For this purpose as is well understood the loss of attenuators must be adjusted in a manner "complementary" to the density of filters 90, 91, and 92. The effect of the attenuators 94, 95, and 96 thus corresponds to the effect of the neutral density filters applied to the sectors of the receiver filter wheel 66 of Fig. 5. Thereby incoming television signals are electrically transformed to a ratio of 1:1:1 for white before being fed to the input of the projectors of the receiver system, which is adapted to reproduce white if fed with equal-size signals. The light efficiency of the systems shown by Fig. 6 is considerably higher than of a system adapted to a signal ratio of 1:1:1 for the selected (face) color. The light produced at the receiver is in general predominantly bluish. This applies to the phosphor screens of receiver tubes as well as to projection devices which produce a point-to-point control of the light flux of a separate light source. In the later case the employed high-intensity arc lamps with extremely high current density as well as the optical devices for light control produce in excess short-waved, i. e. bluish light. The adaptation of these systems to face colors, i. e. to predominantly reddish light, implies a reduction of the light efficiency. This may be avoided by the employment of the mentioned linear reproduction system with a signal ratio of 1:1:1 for white and preceding electrical transformation of the signals.

In case of employment of the process according to the present invention for photographic color reproduction, the spectral response of the taking apparatus is so adjusted that the selected color is recorded with color components of equal size, or in the preferred case with only the red and green color components in substantially equal size. For this purpose either a particular set of suitable primaries may be selected or if the customary sets of taking color filters and reproduction colors are to be utilized, measures may be taken analogous to those explained above with regard to Figs. 4, 5, and 6. In the latter case additional color or neutral density filters are employed which are again "complementary" for taking and for reproduction.

Attention must be invited to the fact that the above indications relative to the ratio of the components refer to additive color mixture. In an additive process color is recreated by superimposition of light of different color. Thus, e. g. in the case of recreating a bluish color, the blue component light will be stronger than the two other component lights, or with a face color the red component will prevail as indicated above. Subtractive processes as are customarily employed in color photography follow a reverse method. The spectral portions of light which are not required to produce a color, are subtracted from a white light beam by means of three superimposed color layers. The colors of these layers are complementary to the employed primary colors; thus e. g. the layer appertaining to the blue primary absorbs the blue portion of the white light, etc. Gradation of the components is generally effected by a variable density of the color layers. The density will thus be inversely proportional to the effective value of the respective "color component." As the present invention lends itself to additive processes as well as to subtractive processes, this specification and particularly the remarks related to the relative size or ratio of "color components" are to be construed so as to apply likewise to the conditions prevailing with additive color mixture as well as with subtractive color mixture.

The projection of such pictures by means of a transparency or a film is effected so that the color components assume the preselected ratio for the selected color. It is irrelevant which process of recording or reproduction is employed and in what manner the adjustment to the ratio of components is effected. By way of example a subtractive film may be employed whereon the color components are recorded by the varying density of three layers of different color, or a lenticulated film, whereon the color components are represented by the transparency of recording elements located behind the individual lenticules. In the latter case the variable transparency of the recording elements may be effected either by variable density (variable-density recording) or by the variable size of transparent areas on opaque background (variable-area recording). In both cases the recording of color components is so adjusted that the film would recreate white on the projection screen, if the color components of recording show the predetermined ratio for the selected color, and a color filter is interposed during the projection which possesses this selected color. Instead of interposing a filter into the projection apparatus, either a filter layer possessing this color may be applied to the film, or the film support may be tinted in this color and thus act as filter itself. This is shown by Figs. 7 and 8. Fig. 7 shows a section through a three-layer subtractive color film. Three layers 101, 102, and 103 are disposed on the transparent support 104 related in a well-known manner to the three primary colors employed. According to the invention an additional layer 105 is applied to the film which is held in the selected color. Fig. 8 likewise shows a three-layer film with layers 101, 102, and 103. In this case, however, the support 106 itself is tinted in the selected color as is indicated by the additional hatching. In case of the production of lenticulated film, the different zones of the multi-zone color filter may also be so adjusted that the selected color is recreated on the screen if the color component recordings are of equal transparency.

The same method may be employed, if reproduction is not to be effected by means of a transparency, but by a print on an opaque support. In this case, as is schematically shown by Fig. 9, three layers 110, 111 and 112 related to the three primaries are applied to an opaque support 113, which must be white, i. e. provide an equal reflectance for light of all colors. A fourth layer 114 is then applied held in the selected color.

In certain cases it may be desirable to employ a non-linear reproduction process with a "gamma" substantially higher than unity. As is well known, such a high gamma will emphasize the larger components and thus provide more "brilliant colors" of reproduction. In contradistinction color reproduction employing an over-all gamma equal to unity will appear pale. This effect may furthermore be employed to counterbalance other desaturating disturbing effects caused, e. g. by the customary taking colour-filters. Employment of a process according to the present invention will permit to utilize this effect, thereby increasing the "brilliancy of colors" without endangering the faithful reproduction of certain colors, e. g. of the face colors.

The above disclosure presents certain specific examples showing the application of the invention. They are not intended to be limiting but to be rather specific examples of the invention as set forth in generic terms in the claims.

Thus for example a process according to the present invention may be applied to reproduction processes which employ more than three components, as were used in the examples brought in the foregoing. This is, e. g. the case with printing processes where a fourth component, viz. black is employed for reproducing the scale of greys ranging from white to black. If the present invention is applied to such a process, the selected color will be used as fourth component instead of black and will thus be reproduced free of amplitude distortion.

In the following claims, the term "a selected color" is to be understood as meaning a true color and not white.

I claim:

1. In a color reproduction system utilizing three variable color components, said system having an inherent overall non-linear brightness transfer characteristic, the process for effecting a non-distorted transfer of a flesh tone through the system over its entire brightness range notwithstanding the inherent non-linear transfer characteristic of said system, said flesh tone being located in an area within the plot of a standard ICI color triangle and said area being substantially defined by an $x$ coordinate in the range between .39 and .44 and by a $y$ coordinate in the range between .345 and .37, comprising the steps of picking up said flesh tone at the input to said system, converting said flesh tone input into three color components of substantially equal value and reconverting said three components at the output of said system into said flesh tone thereby obtaining a correct reproduction of said flesh tone over its entire brightness range.

2. In a sequential television system utilizing three variable red, green and blue color components incorporated in color wheels located respectively at the camera and at the projector, said system having an inherent overall non-linear brightness transfer characteristic, the process for effecting a non-distorted transfer of a flesh tone through the system over its entire brightness range notwithstanding the inherent non-linear transfer characteristic of said system, said flesh tone being located in an area within the plot of a standard ICI color triangle and said area being substantially defined by an $x$ coordinate in range between .39 and .44 and by a $y$ coordinate in the range between .345 and .37, comprising the steps of picking up said flesh tone at the input to said system by balancing the transparency of the red, green and blue filter segments of the color wheel at said camera so that said flesh tone is converted into three substantially equal signals, and reconverting said three signals at the output of said system into said flesh tone by balancing the transparency of the red, green and blue segments of the color wheel at said projector so that said three signals are reconverted into said flesh tone on a screen thereby obtaining a correct reproduction of said flesh tone over its entire brightness range.

3. In a simultaneous color television system utilizing three variable red, green and blue color components incorporated in filters located respectively at the camera and at the projector, said system having an inherent overall non-linear brightness transfer characteristic, the process for effecting non-distorted transfer of a flesh tone through the system over its entire brightness range notwithstanding the inherent non-linear transfer characteristic of said system, said flesh tone being located in an area within the plot of a standard ICI color triangle and said area being substantially defined by an $x$ coordinate in the range between .39 and .44 and by a $y$ coordinate in the range between .345 and .37, comprising the steps of picking up said flesh tone at the input to said system by balancing the transparency of the red, green and blue filters at said camera so that said flesh tone is converted into three substantially equal signals, and reconverting said three signals at the output of said system into said flesh tone by balancing the transparency of the red, green and blue filters at the projector so that said three signals are reconverted to said flesh tone on a screen thereby obtaining a correct reproduction of said flesh tone over its entire brightness range.

4. In a system for photographically reproducing color images by three different color component recordings including a taking apparatus and a projector, said system having an overall inherent non-linear brightness transfer characteristic, the process for effecting non-distorted transfer of a flesh tone through the system over its entire brightness range notwithstanding the inherent non-linear transfer characteristic of said system, said flesh tone being located in an area within the plot of a standard ICI color triangle and said area being substantially defined by an $x$ coordinate in the range between .39 and .44 and by a $y$ coordinate in the range between .345 and .37, comprising the steps of converting said flesh tone at the taking apparatus of the system into three color component recordings of substantially equal density, and reconverting said three recordings at the projector output of said system into said flesh tone by projecting said recordings with a light having flesh tone colors thereby obtaining a correct reproduction of said flesh tone over its entire brightness range.

5. In a system including a taking apparatus for photographically reproducing color images on an opaque support by three different color component recordings, said system having an inherent overall non-linear brightness transfer characteristic, the process for effecting non-distorted transfer of a flesh tone through the system over its entire brightness range notwithstanding the inherent non-linear transfer characteristic of said system, said flesh tone being located in an area within the plot of a standard ICI color triangle and said area being substantially defined by an $x$ coordinate in the range between .39 and .44 and by a y coordinate in the range between .345 and .37, comprising the steps of converting said flesh tone at said taking apparatus into three color component recordings of substantially equal density, and reconverting said three recordings at said opaque support by giving said support flesh tone colors thereby obtaining a correct reproduction of said flesh tone over its entire brightness range.

References Cited in the file of this patent

UNITED STATES PATENTS

| | | |
|---|---|---|
| 2,416,918 | Goldsmith | Mar. 4, 1947 |
| 2,416,919 | Goldsmith | Mar. 4, 1947 |
| 2,429,849 | Somers | Oct. 28, 1947 |
| 2,566,693 | Cherry | Sept. 4, 1951 |
| 2,627,547 | Bedford | Feb. 3, 1953 |